UNITED STATES PATENT OFFICE.

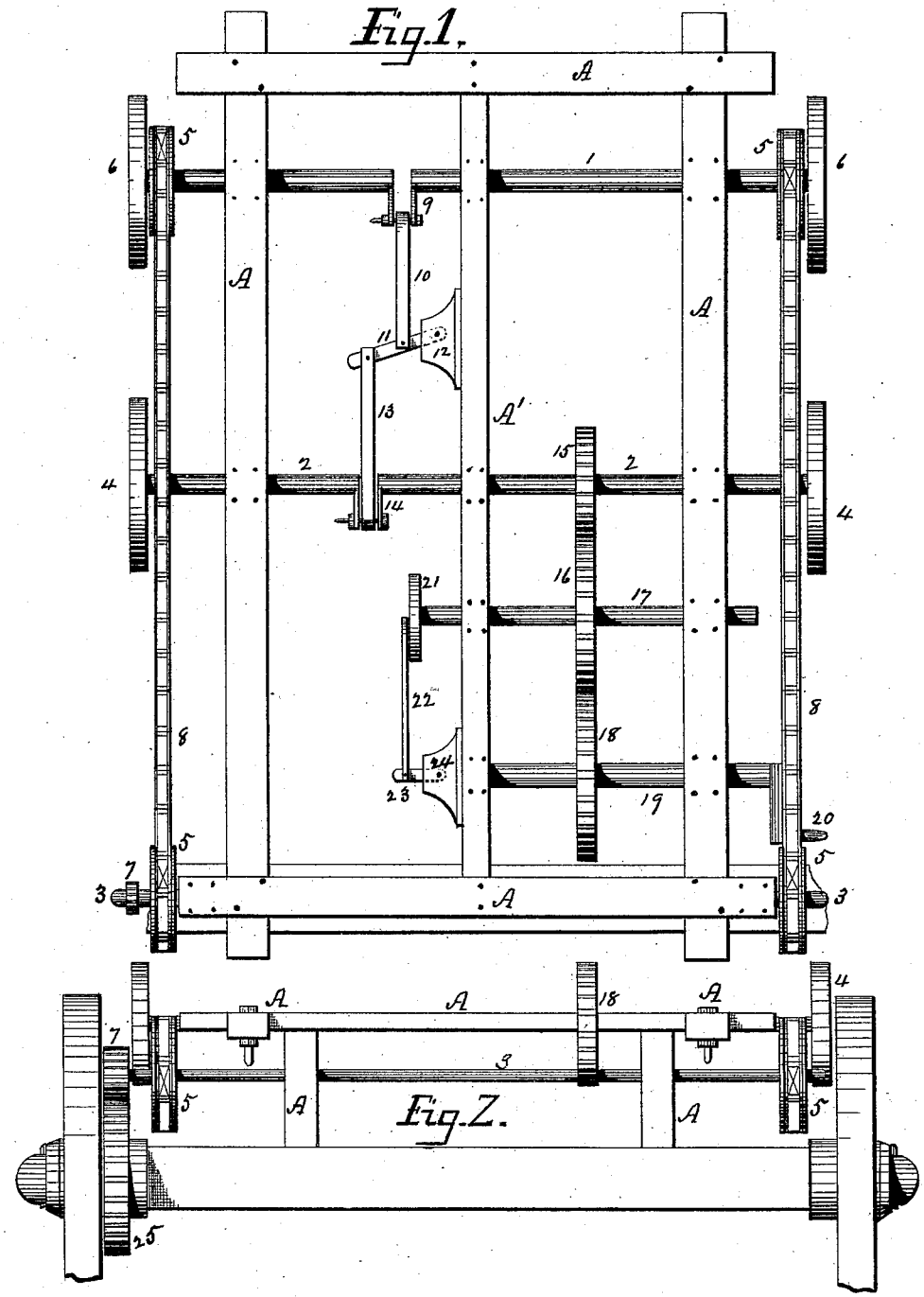

CHARLES A. HATTER, OF GREENFIELD, FAIRFIELD COUNTY, OHIO.

MECHANICAL DEVICE.

SPECIFICATION forming part of Letters Patent No. 357,596, dated February 15, 1887.

Application filed July 28, 1886. Serial No. 209,297. (No model.)

*To all whom it may concern:*

Be it known that I, CHARLES A. HATTER, a citizen of the United States, residing at Greenfield township, in the county of Fairfield and State of Ohio, have invented certain new and useful Improvements in Mechanical Devices; and I do hereby declare the following to be a full, clear, and exact description of the invention, such as will enable others skilled in the art to which it appertains to make and use the same.

My invention relates to improvements in mechanical devices; and my said invention consists in a novel assembly of gear-wheels, balance-wheels, pulleys connecting endless chains, shafts, belts, &c., whereby a machine for applying power or driving other forms of machinery is produced that is capable of being operated either by hand or connection with an ordinary farm-wagon, whereon it is placed, and receives its motion from one of the rear wheels thereof as said wheel passes over the ground.

The object of this invention is to produce a machine for operating other forms of machinery that will possess great power and yet be simple in construction, easy of operation, and capable of being driven both by hand and horse or other power.

Referring now to the accompanying drawings for a better understanding of the details of construction and operation of my invention, Figure 1 represents a plan view of a machine constructed according to my invention, and Fig. 2 is an end elevation of the same as applied to the truck or running-gear of an ordinary farm-wagon and as geared to and receiving its motion from one of the hind wheels thereof.

This machine is intended mainly for use upon the farm for driving the various implements and machines there employed, and to construct such a machine I proceed as follows, reference being again had to the accompanying drawings, whereon A A' represent a rectangular frame, of any suitable dimensions, and either of wood or metal, to which the several wheels, &c., composing my power-machine are journaled. Transversely across this frame A A' are mounted three shafts, 1, 2, and 3, the shafts 1 and 3 being arranged at the ends of the frame, while the shaft 2 is at the center thereof, and this central shaft, 2, carries at its ends balance-wheels 4 4, while upon the ends of the shafts 1 and 3 are keyed chain or spur wheels 5 5. In addition to the chain-wheels 5 on shaft 1 said shaft also carries a band-wheel, 6, and upon one end of the shaft 3 is a gear-wheel, 7. 8 8 are endless chains connecting the shafts 1 and 3, and by which motion is imparted from one to the other.

Upon the shaft 1 is a crank, 9, which, through the intervention of a pitman, 10, rocker-arm 11, working in a socket, 12, attached to the center brace, A', of the frame, connecting-rod 13, and crank 14 on the center shaft, 2, communicates motion from the shaft to said shaft 2. This shaft 2 carries a small gear-wheel, 15, which meshes with a larger gear-wheel, 16, upon a short shaft, 17, which in turn meshes with a still larger gear-wheel, 18, on a short shaft, 19, at whose end is a hand-crank, 20, whereby the machine may be operated by hand-power. The short shafts 17 and 19 are, as also the long ones, 1, 2, and 3, journaled in suitable boxes secured to the frame A A' of the machine, and the said short shaft 17 carries at its end a balance-wheel, 21, connected by a pitman, 22, to a rocker-arm, 23, working in a socket, 24, secured to the central brace, A', of the machine.

This constitutes the several mechanical elements or devices composing my machine. Now, to operate the same, if it is intended to remain stationary to run stationary machinery—such as a pump, feed-cutter, thrashing-machine, &c.—the machine is arranged in the proper position relatively to said machine to be operated, and connected thereto by a belt over pulley 6.

Should the machine be desired for use in driving the mowing, reaping, or other moving machine, it is placed upon the bed or truck of an ordinary wagon, and connected to one of the rear wheels thereof through the intervention of the gear-wheel 7, meshing with a gear-wheel, 25, applied to the said rear wheel, as shown in Fig. 2, whereby the movement of said wagon-wheel as the wagon is drawn along is communicated to my machine, and through it to the mower, reaper, &c., by band around band-wheel 6 and the usual driving-pulley of said reaper or other machine to be driven. The three balance-wheels 4, 4, and 21 equalize the motion of the machine, and the pitman-connection 10 11 12 13, &c., simplifies the connection between the shafts 1 and 2, and decreasing the friction and requiring less power than were the gear-wheels continued from shaft 1 to 2 as from 2 to 19. If desired, the parts 22, 23, and 24 may be omitted, and when the machine is used by hand-power applied to the crank 20 the endless chains 8 8 are disconnected and not in operation.

When this device is intended to be operated in connection with a reaper, said reaper is secured in any suitable manner—such, for instance, as placing the pole of said reaper to which the team is usually attached beneath the running-gear or truck of the wagon upon which my device is carried from the rear, and securing said pole in such position that the cutting-bar of said reaper will project laterally from the rear edge of the rear wheel of the wagon. The movement of the wagon will therefore be communicated to the reaper, and through the rotation of the rear wheels of said wagon, acting through the interposed devices of my apparatus previously described, will communicate motion to the band-wheel 6, and through a band thereon to the cutting devices of the reaper.

Of course, when my device is so used in connection with a reaper or similar machine, the usual means employed by such machines for operating the cutting-gears thereof is dispensed with and direct connection made from said cutting-gears with the band-pulley of my device.

Having thus described my invention, what I claim as new therein, and desire to secure by Letters Patent of the United States, is—

The mechanical device herein described and shown, consisting of the frame A A', shafts 1, 2, 3, 17, and 19, balance-wheels 4 4 and 21, pulleys 6, chain-wheels 5, endless chains 8, pitman 10, rocker-arm 11, connecting-rod 13, and gear-wheels 7, 15, 16, and 18, combined with the gear-wheel 25 on the wagon-wheel, all constructed, arranged, and adapted to operate as and for the purposes specified.

In testimony whereof I affix my signature in presence of two witnesses.

CHARLES A. HATTER.

Witnesses:
W. A. SCHULTZ,
W. H. WOLFE.